United States Patent
Sun

(10) Patent No.: US 11,948,537 B2
(45) Date of Patent: Apr. 2, 2024

(54) IMAGE DISPLAY METHOD AND APPARATUS, COMPUTER READABLE STORAGE MEDIUM, AND ELECTRONIC APPARATUS

(71) Applicant: ZTE Corporation, Shenzhen (CN)

(72) Inventor: Xiaofan Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/925,076

(22) PCT Filed: Jun. 15, 2021

(86) PCT No.: PCT/CN2021/100117
§ 371 (c)(1),
(2) Date: Nov. 14, 2022

(87) PCT Pub. No.: WO2021/259093
PCT Pub. Date: Dec. 30, 2021

(65) Prior Publication Data
US 2023/0197038 A1    Jun. 22, 2023

(30) Foreign Application Priority Data
Jun. 24, 2020   (CN) .......................... 202010591400.X

(51) Int. Cl.
*G06K 9/00*    (2022.01)
*G06T 3/40*    (2006.01)
(Continued)

(52) U.S. Cl.
CPC .............. *G09G 5/377* (2013.01); *G06T 3/40* (2013.01); *G06V 10/82* (2022.01); *H04M 1/0268* (2013.01)

(58) Field of Classification Search
CPC ........ G09G 5/377; G09G 3/007; G06V 10/82; G06T 3/40; G06T 15/205; H04M 1/0268; H04N 13/398
(Continued)

(56) References Cited

U.S. PATENT DOCUMENTS

| 2011/0158504 A1 | 6/2011 | Turner |
| 2012/0063680 A1* | 3/2012 | Daisy ................... G06T 15/205 |
| | | 382/165 |

(Continued)

FOREIGN PATENT DOCUMENTS

| CN | 102903143 A | 1/2013 |
| CN | 103903213 A | 7/2014 |

(Continued)

OTHER PUBLICATIONS

International Search Report for corresponding application PCT/CN2021/100117 filed Jun. 15, 2021; dated Sep. 13, 2021.

*Primary Examiner* — Abdul-Samad A Adediran
(74) *Attorney, Agent, or Firm* — CANTOR COLBURN LLP

(57) ABSTRACT

Provided in embodiments of the present disclosure are an image display method and apparatus, a computer readable storage medium, and an electronic apparatus. The image display method is applied to a terminal, and the method includes: separating a target image into a plurality of image layers, wherein the plurality of image layers at least includes a first image layer and a second image layer; adjusting an image layer parameter of at least one of the first image layer and the second image layer according to a relative relationship between the first image layer and the second image layer; and displaying the target image according to at least one of the first image layer and the second image layer of which the image layer parameter is adjusted.

19 Claims, 10 Drawing Sheets

(51) Int. Cl.
  *G06V 10/82* (2022.01)
  *G09G 5/377* (2006.01)
  *H04M 1/02* (2006.01)

(58) Field of Classification Search
  USPC .................................. 345/82, 204; 382/165
  See application file for complete search history.

(56) References Cited

U.S. PATENT DOCUMENTS

2012/0063740 A1   3/2012   Lee
2014/0184669 A1*  7/2014   Oh .................... G09G 3/007
                                              345/82
2014/0354610 A1* 12/2014   Hosoda ............ H04N 13/398
                                              345/204
2019/0080493 A1   3/2019   Dawson

FOREIGN PATENT DOCUMENTS

CN    109064390 A    12/2018
CN    109976624 A    7/2019

* cited by examiner (Enlarged state of shadow)

(Reduced state of shadow)

(Right stretched state of shadow)

(Left stretched state of shadow)

IMAGE DISPLAY METHOD AND APPARATUS, COMPUTER READABLE STORAGE MEDIUM, AND ELECTRONIC APPARATUS

CROSS REFERENCE

This application is a National Stage Filing of the PCT International Application No. PCT/CN2021/100117 filed on Jun. 15, 2021, which claims priority to Chinese Patent Application No. 202010591400.X filed on Jun. 24, 2020, the entirety of which is herein incorporated by reference.

TECHNICAL FIELD

Embodiments of the present disclosure relate to the field of image processing, and in particular, to an image display method and apparatus, a computer readable storage medium, and an electronic apparatus.

BACKGROUND

With the development of communication technologies, terminals such as smart phones and tablet computers have become necessary components of daily life of users. When a user uses a terminal, requirements for convenience of operations on the terminal and user experience are also increasing. As a more flexible and convenient form of flexible display unit, a flexible screen attracts more and more attention of users. Compared with a traditional flexible display unit, a flexible screen has the characteristics of being bendable, flexible, and more durable, and being lighter and thinner in volume relative to a traditional flexible display unit. In addition, the flexible screen may be combined with many operations by means of bending, so that a new user experience is provided for the user, thereby improving the degree of satisfaction of the user with regard to the terminal.

On the other hand, in the related art, Three Dimensional (3D) display technologies such as Augmented Reality (AR) and Virtual Reality (VR) are increasingly mature. The application of 3D display in a terminal is also favored by users, and has a good application prospect in various application fields such as online shopping, communication and entertainment.

At present, all of the 3D display technologies in the related art achieve display based on a traditional flexible display unit. However, in a 3D display implementation process based on the traditional flexible display unit, no corresponding design is provided for a bendable feature and an operation mode of a flexible screen, therefore a 3D display effect cannot be effectively achieved by the flexible screen based on the 3D display implementation provided in the related art.

In view of the problem in the related art that a 3D display effect cannot be effectively achieved on a flexible screen, no effective solution has been proposed in the related art.

SUMMARY

The embodiments of the present disclosure provide an image display method and apparatus, a computer readable storage medium, and an electronic apparatus, which may at least solve the problem in the related art that a 3D display effect cannot be effectively achieved on a flexible screen.

According to an embodiment of the present disclosure, provided is an image display method applied to a terminal. The method includes:

separating a target image into a plurality of image layers, wherein the plurality of image layers at least includes a first image layer and a second image layer;

adjusting an image layer parameter of at least one of the first image layer and the second image layer according to a relative relationship between the first image layer and the second image layer; and displaying the target image according to at least one of the first image layer and the second image layer of which the image layer parameter is adjusted.

According to another embodiment of the present disclosure, provided is an image display apparatus disposed on a terminal. The apparatus includes:

a layer separation module, configured to separate a target image into a plurality of image layers, wherein the plurality of image layers at least includes a first image layer and a second image layer;

an adjusting module, configured to adjust an image layer parameter of at least one of the first image layer and the second image layer according to a relative relationship between the first image layer and the second image layer;

a displaying module, configured to display the target image according to at least one of the first image layer and the second image layer of which the image layer parameter is adjusted.

According to another embodiment of the present disclosure, provided is a computer readable storage medium. The computer readable storage medium stores a computer program, wherein the computer program is configured to execute the operations in any one of the method embodiments at runtime.

According to another embodiment of the present disclosure, provided is an electronic apparatus, including a memory and a processor, wherein the memory stores a computer program, and the processor is configured to run the computer program so as to execute the operations in any one of the method embodiments.

DETAILED DESCRIPTION

The embodiments of the present disclosure will be described below in detail with reference to the drawings and exemplary embodiments.

It should be noted that the terms "first" and "second" in the description, claims, and accompanying drawings of the present disclosure are used to distinguish similar objects, and are not necessarily used to describe a specific sequence or order.

To further illustrate the image display method and apparatus, the computer readable storage medium, and the electronic apparatus in the embodiments of the present disclosure, application scenarios of the image display method and apparatus, the computer readable storage medium, and the electronic apparatus in the embodiments of the present disclosure are described below.

Figure 1:
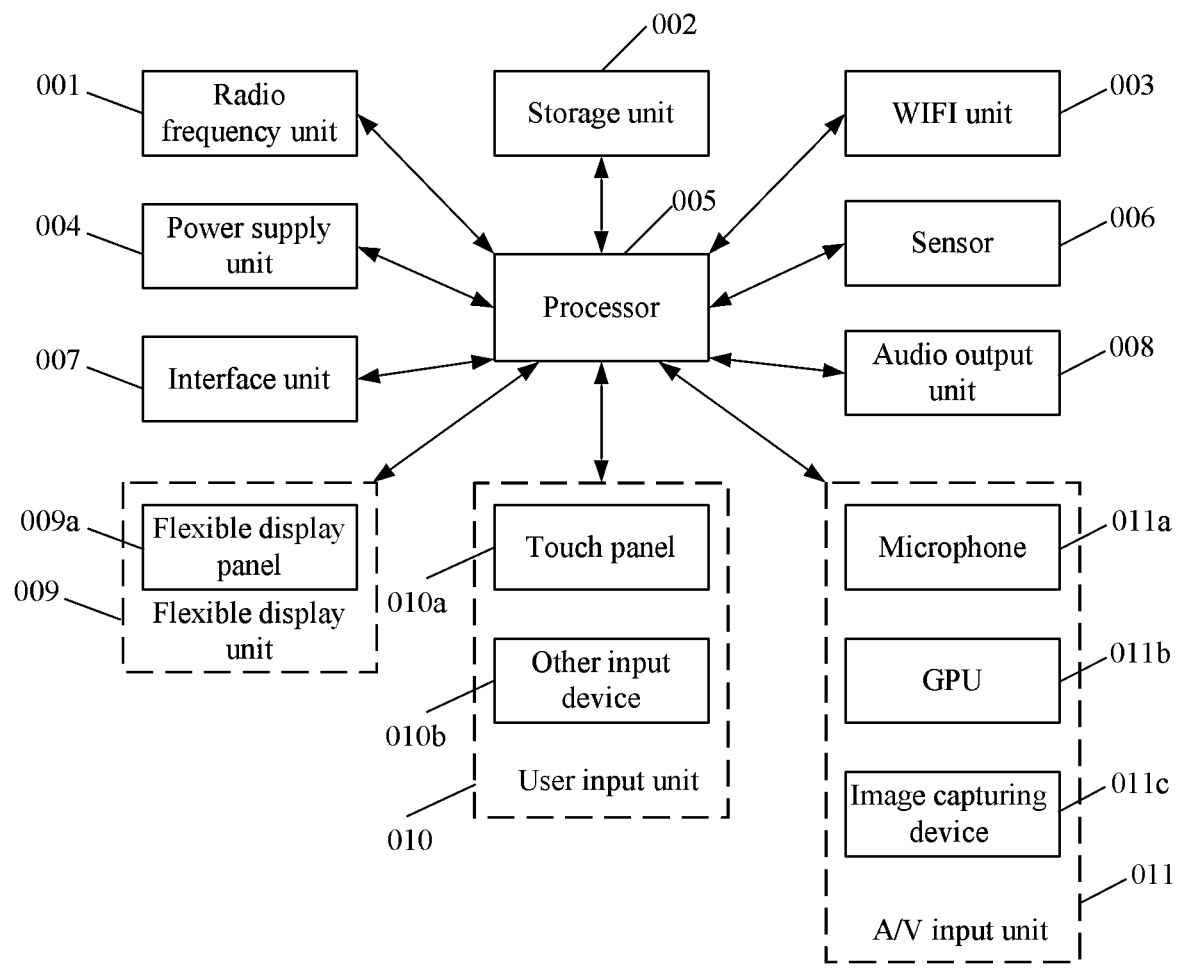
FIG. 1 is a schematic diagram of a hardware structure of a mobile terminal according to an embodiment of the present disclosure.

The terminal in the embodiment of the present disclosure may be embodied as a mobile terminal, a tablet computer, a computer terminal, or a similar computing apparatus. Taking the implementation on a mobile terminal as an example, FIG. 1 is a schematic diagram of a hardware structure of a mobile terminal according to an embodiment of the present disclosure. As shown in FIG. 1, the mobile terminal in the embodiments of the present disclosure includes follows.

The mobile terminal includes a radio frequency unit 001, a storage unit 002, a Wireless Fidelity (WIFI) unit 003, a power supply unit 004, a processor 005, a sensor 006, an interface unit 007, an audio output unit 008, a flexible display unit 009, a user input unit 010, an AN input unit 011 and other components. It should be noted that the structure of the mobile terminal shown in FIG. 1 does not limit the mobile terminal, and the mobile terminal may include more or fewer components than those shown in FIG. 1, or some components may be combined or have different component arrangements. Specific introduction to the above components is provided as follows.

The radio frequency unit 001 is configured to receive and send information or receive and send signals during a call. Specifically, the radio frequency unit 001 may send uplink information to a base station, and may also receive downlink information sent by the base station and then send the downlink information to the processor 005 of the mobile terminal for processing. The downlink information sent by the base station to the radio frequency unit 001 may be generated according to the uplink information sent by the radio frequency unit 001. Alternatively, the downlink information sent by the base station may also be actively pushed to the radio frequency unit 001 after information update of the mobile terminal is detected, for example, after it is detected that a geographical position where the mobile terminal is located changes, the base station may send a message notification about the change of the geographical position to the radio frequency unit 001 of the mobile terminal; after receiving the message notification, the radio frequency unit 001 may send the message notification to the processor 005 of the mobile terminal for processing; and the processor 005 of the mobile terminal may control the message notification to be displayed on a flexible display panel 009a of the mobile terminal. Generally, the radio frequency unit 001 includes, but is not limited to, an antenna, at least one amplifier, a transceiver, a coupler, a low noise amplifier, and the like. In addition, the radio frequency unit 001 may also communicate with a network and other devices via wireless communication, which may specifically include communicating with a server in a network system via wireless communication. For example, the mobile terminal may download a file resource (for example, an application program) from the server via wireless communication; after the mobile terminal completes the downloading of a certain application program, if the file resource corresponding to the application program in the server is updated, the server may push a resource update message notification to the mobile terminal via wireless communication, so as to remind the user to update the application program. The wireless communication may be performed according to any communication standard or protocol, including but not limited to Global System of Mobile communication (GSM), General Packet Radio Service (GPRS), Code Division Multiple Access 2000 (CDMA2000), Wideband Code Division Multiple Access (WCDMA), Time Division-Synchronous Code Division Multiple Access (TD-SCDMA), Frequency Division Duplexing-Long Term Evolution (FDD-LTE), Time Division Duplexing-Long Term Evolution (TDD-LTE), and the like.

The storage unit 002 is configured to store a software program and various data. Specifically, the storage unit 002 may mainly include a program storage area and a data storage area, wherein the program storage area may store an operating system, an application program required by at least one function, and the like; and the data storage area may store data created according to use of the mobile phone, and the like. In addition, the storage unit 002 may include a high-speed random access memory, and may also include a non-volatile memory, for example, at least one magnetic disk storage device, a flash memory device, or another volatile solid-state storage device.

The WIFI unit 003 is configured to provide wireless broadband Internet access. Specifically, WIFI is a short-distance wireless transmission technology, and the mobile terminal may access a network via the WIFI unit 003, so as to realize functions such as receiving and sending of an email, browsing a webpage and accessing streaming media by the user.

The power supply unit 004 is configured to supply power to the mobile terminal. Specifically, the power supply unit 004 is logically connected to the processor 005 through a power supply management system, so as to implement functions such as charging, discharging, and power consumption management through the power supply management system.

The processor 005 constitutes a control centre of the mobile terminal, is connected to various parts of the whole mobile terminal through various interfaces and lines, and executes various functions of the mobile terminal and processes data by running or executing a software program and/or module stored in the storage unit 002 and invoking data stored in the storage unit 002, so as to monitor the whole mobile terminal. For example, the processor 005 may execute the image display method in the embodiments of the present disclosure. Specifically, the processor 005 may include one or more processing units. In addition, the processor 005 may also integrate an application processor and a modulation-demodulation processor, wherein the application processor mainly processes an operating system, a user interface, an application program, etc., and the modulation-demodulation processor mainly processes wireless communication. It can be understood that the above modulation-demodulation processor may also not be integrated in the processor 005.

The sensor 006 may include sensors such as light sensors, motion sensors, and other sensors. Specifically, the light sensor includes an ambient light sensor and a proximity sensor, wherein the ambient light sensor may adjust the brightness of the flexible display panel 009a according to the brightness of ambient light, and the proximity sensor may turn off the flexible display panel 009a or the backlight when the mobile terminal moves to the ear. The motion sensor may include an accelerometer sensor. The accelerometer sensor may detect the magnitude of acceleration in various directions (generally three axes), and may detect the magnitude and direction of gravity when stationary. The accelerometer sensor may be configured to implement an application for recognizing a posture of the mobile terminal (for example, switching between a horizontal screen and a vertical screen, a related game, and magnetometer posture calibration), a vibration recognition related function (for example, a pedometer and knocking), and the like. It should be noted that, the mobile terminal may also be configured with other sensors such as a gravity sensor, a fingerprint sensor, a pressure sensor, an iris sensor, a molecular sensor, a gyroscope, a barometer, a hygrometer, a thermometer, and an infrared sensor based on those shown in FIG. 1, which is not limited in the embodiments of the present disclosure.

The interface unit 007 is configured to receive input (e.g., data information, power, etc.) from an external device and send the received input to one or more elements of the mobile terminal or may be configured to send data between the mobile terminal and the external device. Specifically, the interface unit 007 includes at least one interface through which an external device may be connected to the mobile terminal, for example, the external device may include a wired or wireless headset port, an external power supply (or battery charger) port, a wired or wireless data port, a memory card port, a port provided to connect to a device having an identification module, an audio Input/Output (I/O) port, a video I/O port, an earphone port, and the like.

The audio output unit 008 is configured to convert audio data received by the radio frequency unit 001 or the WIFI unit 003 or stored in the storage unit 002 into an audio signal and output the audio signal as sound when the mobile terminal is in a call signal receiving mode, a call mode, a recording mode, a voice recognition mode, a broadcast receiving mode, or the like. Meanwhile, the audio output unit 008 may also provide an audio output (e.g., a call signal reception sound, a message reception sound, etc.) related to a particular function performed by the mobile terminal. The audio output unit 008 may include a speaker, a buzzer, and the like.

The flexible display unit 009 is configured to display information input by a user or information provided to the user. Specifically, the flexible display unit 009 may include a flexible display panel 009a having bendable characteristics. The flexible display panel 009a may be a panel of different types, structures, or materials, such as an Active Matrix/Organic Light-Emitting Diode (AMOLED) and a Passive matrix OLED. It should be noted that, the flexible display panel adopted by the flexible display unit 009 in the embodiments of the present disclosure is a flexible display panel in the related art, and those having ordinary skill in the art already know a bending structure and a bending control method of the flexible display panel, and thus the description thereof is omitted herein.

The user input unit 010 is configured to receive inputted number or character information and generate a key signal input related to user setting and function control of the mobile terminal. Specifically, the user input unit 010 may include a touch panel 010a and other input devices 010b. The touch panel 010a, also referred to as a touch screen, may collect a touch operation of a user on or near the touch panel 010a, and drive a corresponding connection apparatus according to a preset program. The touch panel 010a may include two parts: a touch detection apparatus and a touch controller, wherein the touch detection device detects a touch direction of the user, detects a signal triggered by a touch operation, and sends the signal to a touch controller; the touch controller receives touch information from the touch detection apparatus, converts the touch information into touch coordinates, and sends the touch coordinates to the processor 005, and may receive and execute a command sent by the processor 005. In addition, the touch panel 010a may be implemented in various types such as a resistive type, a capacitive type, an infrared type, and a surface acoustic wave type. In addition to the touch panel 010a, the user input unit 010 may further include other input devices 010b, which may include but are not limited to one or more of a physical keyboard, a function key (such as a volume control key and a switch key), a trackball, a mouse, and a joystick, which are not limited in the embodiments of the present disclosure.

The A/V input unit 011 is configured to receive audio or video signals. The A/V input unit 011 may include a microphone 011a, a Graphics Processing Unit (GPU) 011b, and an image capturing device 011c. The GPU 011b processes image data of a still picture or video obtained by the image capturing device 011c such as a front camera, a rear camera, or the like in the video capturing mode or the picture capturing mode. The processed image frame may be displayed on the flexible display unit 009. The image frames processed by the GPU 011b may be stored in the storage unit 002 or sent via the radio frequency unit 001 or the WIFI unit 003. The microphone 011a may receive audio data via the microphone 011a in an operation mode such as a telephone call mode, a recording mode, a voice recognition mode, and the like, and may be capable of processing the sound into audio data. The processed audio data may be converted into a format transmittable to a mobile communication base station via the radio frequency unit 001 and output to the mobile communication base station in the case of a telephone communication mode. The microphone 011a may implement various types of noise cancellation or suppression algorithms to cancel or suppress noise or interference generated in the process of receiving and sending audio signals.

Figure 2:
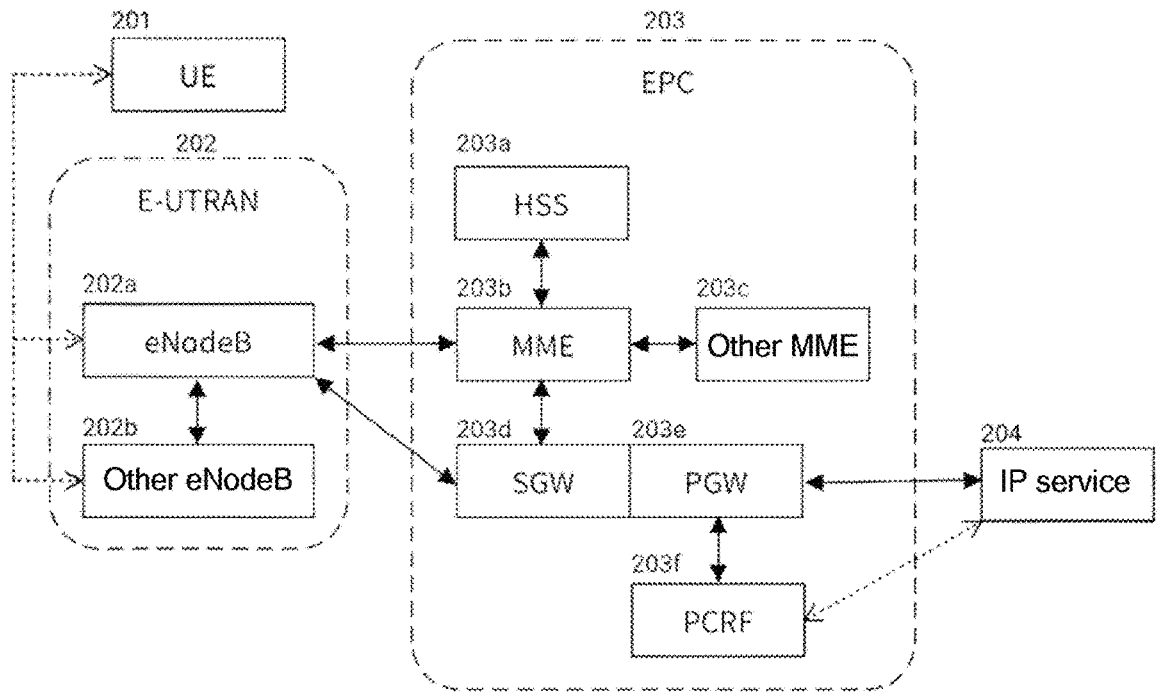
FIG. 2 is a system architecture diagram of a communications network according to an embodiment of the present disclosure.

A case where the terminal operates in an LTE system adopting a universal mobile telecommunication technology is taken as an example for illustration in the embodiments of the present disclosure. FIG. 2 is a system architecture diagram of a communications network according to an embodiment of the present disclosure. As shown in FIG. 2, the LTE system includes User Equipment (UE) 201, an Evolved UMTS Terrestrial Radio Access Network (E-UTRAN) 202, an Evolved Packet Core (EPC) 203, and an IP service 204 of an operator that are connected in sequence. It should be noted that the UE 201 is the terminal in the embodiments of the present disclosure.

The E-UTRAN 202 includes eNodeB 202a and other eNodeBs 202b, etc. The eNodeB 202a may be connected to other eNodeBs 202b by means of a Back Haul, such as an X2 interface. After being connected to the eNodeB 202a, the UE 201 may receive a push message notification sent by the eNodeB 202a. The eNodeB 202a may be connected to the EPC 203, and the eNodeB 202a may provide an access of the UE 201 to the EPC 203.

The EPC 203 may include a Mobility Management Entity (MME) 203b, a Home Subscriber Server (HSS) 203a, other MMEs 203c, a Serving Gate Way (SGW) 203d, a PDN Gate Way (PGW) 203e, and a Policy and Charging Rules Function (PCRF) 203f, etc. The MME 203b is a control node that processes signaling between the UE 201 and the EPC 203, and provides bearer and connection management. The HSS 203a is configured to provide some registers to manage functions such as home location registers and to store some user specific information regarding service features, data rates, etc. All user data may be sent via the SGW 203d. The PGW 203e may provide IP address allocation and other functions for the UE 201. The PCRF 203f is a policy and charging control policy decision point for service data flows and IP bearer resources, and selects and provides available policy and charging control decisions for the policy and charging enforcement function unit.

The IP service 204 may include the Internet, an intranet, an IP Multimedia Subsystem (IMS) or other IP services, etc.

It should be noted that although the foregoing description is given by taking the LTE system as an example, the embodiments of the present disclosure are not only applicable to the LTE system, but also applicable to other wireless communication systems, such as GSM, CDMA2000, WCDMA, TD-SCDMA, and future new network systems, which is not limited in the present disclosure.

The image display method and apparatus, the computer readable storage medium and the electronic apparatus in the embodiments of the present disclosure are described below.

Figure 3:
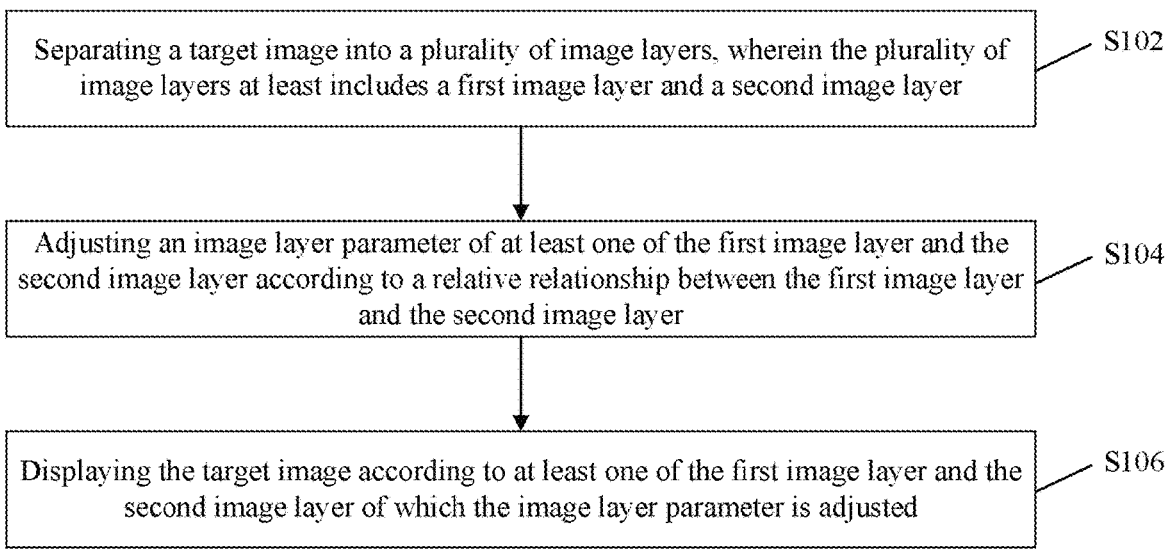
FIG. 3 is a flowchart (1) of an image display method according to an embodiment of the present disclosure.

An embodiment of the present disclosure provides an image display method applied to a terminal. FIG. 3 is a flowchart (1) of an image display method according to an embodiment of the present disclosure. As shown in FIG. 3, the image display method in the embodiment of the present disclosure includes operations S102 to S106.

At S102, a target image is separated into a plurality of image layers, wherein the plurality of image layers at least includes a first image layer and a second image layer.

It should be noted that the target image in the embodiment of the present disclosure may be a target picture or a target video. In the process that a user starts a corresponding picture or video file by means of an application of a terminal (for example, the user browses a picture or a video by means of a multimedia library application), the picture or video file may be taken as the target image. In the embodiment of the present disclosure, a 3D display mode may be directly entered according to a system setting of the terminal, so that the above picture or video file may be displayed in the 3D display mode. Alternatively, the user may also actively select to enter a 3D display mode by means of a touch switch, gesture control, voice control, etc., so that the above picture or video file may be displayed in the 3D display mode. The embodiment of the present disclosure does not limit the mode of entering the 3D display mode.

It should be noted that, when the target image is a target picture, the picture may be directly separated into layers; and when the target image is a target video, a video frame of the target video needs to be extracted and then separated into layers. The target image after layer separating may include a plurality of image layers, and the first image layer and the second image layer represent any two image layers in the plurality of image layers, therefore, the following processing operations for at least one of the first image layer and the second image layer may be applicable to any two image layers in the plurality of image layers into which the target image is correspondingly separated.

Figure 4:
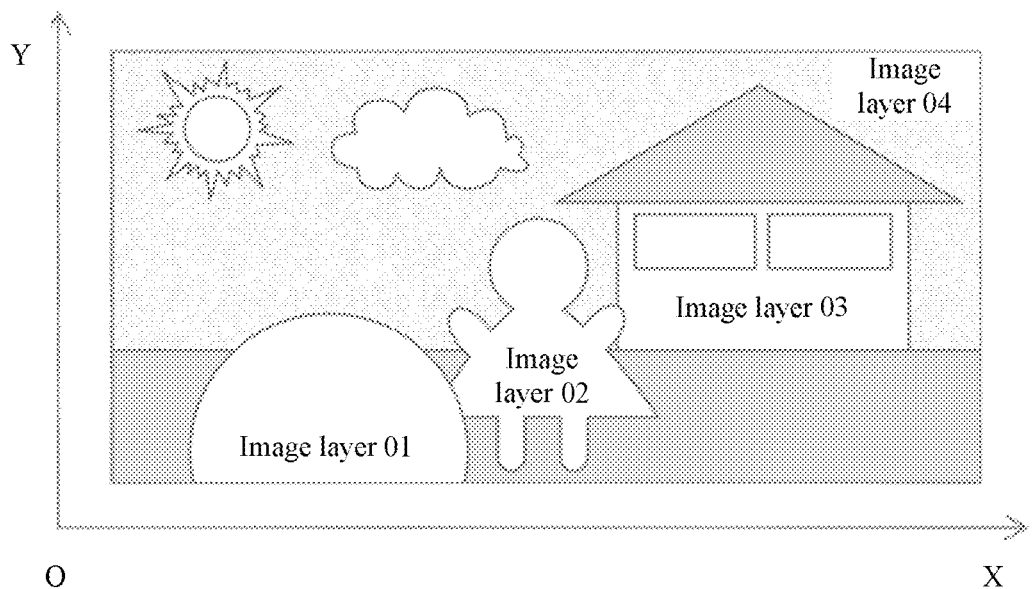
FIG. 4 is a schematic diagram (1) of separating a target image into image layers according to an embodiment of the present disclosure.
Figure 5:
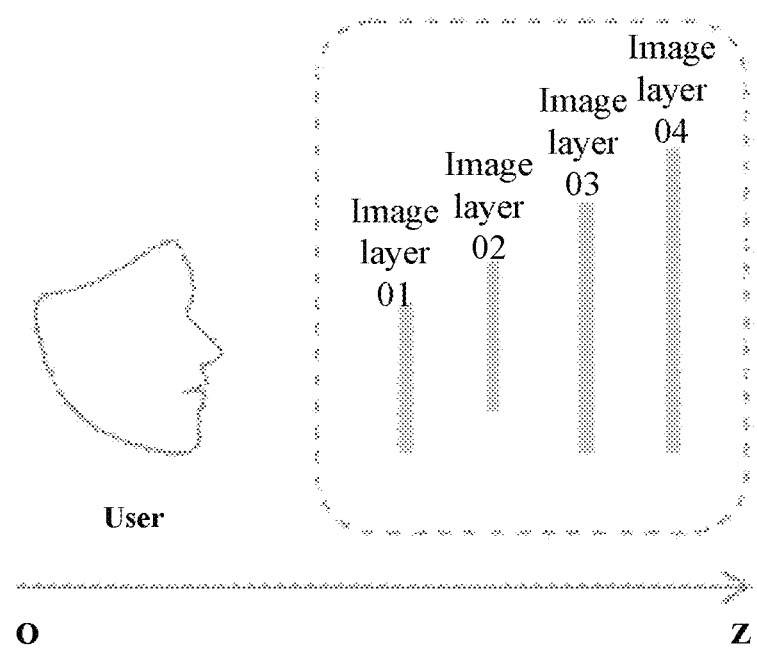
FIG. 5 is a schematic diagram (2) of separating a target image into image layers according to an embodiment of the present disclosure.

In an example, schematic diagrams of distribution of image layers obtained by separating the target image are shown in FIGS. 4 and 5. FIG. 4 is a schematic diagram (1) of separating a target image into image layers according to an embodiment of the present disclosure. As shown in FIG. 4, the target image is separated into an image layer 01, an image layer 02, an image layer 03, and an image layer 04. The distribution of the image layer 01, the image layer 02, the image layer 03, and the image layer 04 in the X-axis and the Y-axis is shown in FIG. 4, wherein the image layer 01 is located at the top layer, and the image layer 04 is located at the bottom layer so as to form a background layer. Here, the X axis and the Y axis are coordinate axes in the plane coordinate system established by the display plane of the terminal. The first image layer and the second image layer in the embodiment of the present disclosure may correspond to the image layer 01 and the image layer 02 shown in FIG. 4.

Figure 6:
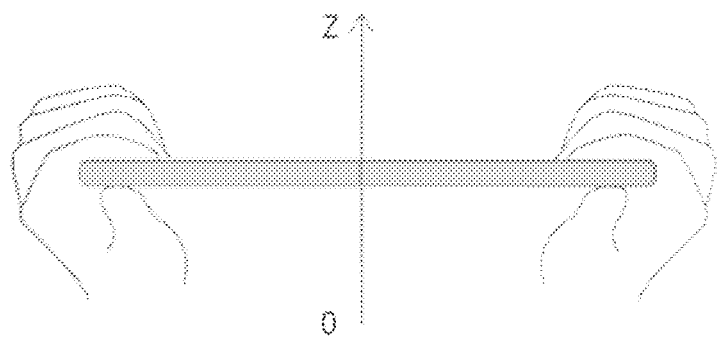
FIG. 6 is a schematic diagram of a Z-axis direction according to an embodiment of the present disclosure.

FIG. 5 is a schematic diagram (2) of separating a target image into image layers according to an embodiment of the present disclosure, and the distribution of the image layer 01, the image layer 02, the image layer 03 and the image layer 04 on the Z axis is as shown in FIG. 5, wherein the image layer 01 is located at the top layer, i.e., the image layer 01 is closest to the user. Here, the Z axis is a Z axis in a three-dimensional coordinate system established based on the above plane coordinate system. FIG. 6 is a schematic diagram of a Z-axis direction according to an embodiment of the present disclosure. As shown in FIG. 6, the direction of the Z axis is a direction in which the user observes the terminal.

It should be noted that, in the foregoing example, separating the target image into four layers is only an example for clearly describing the process of separating the target image into image layers in the embodiment of the present disclosure, and a specific number of image layers and a layer separating manner are not limited in the embodiment of the present disclosure.

At S104, an image layer parameter of at least one of the first image layer and the second image layer is adjusted according to a relative relationship between the first image layer and the second image layer.

It should be noted that, in the embodiment of the present disclosure, the relative relationship between the first image layer and the second image layer may be predetermined by a processor of the terminal. In an exemplary embodiment, after operation S102 is executed, the terminal may determine the relative relationship between the first image layer and the second image layer. The relative relationship between the first image layer and the second image layer includes: a relative position between the first image layer and the second image layer, and a relative distance between the first image layer and the second image layer; the relative position is used for indicating an arrangement position between the first image layer and the second image layer in the plurality of image layers, and the relative distance is used for indicating a distance between the first image layer and the second image layer.

It should be noted that the relative position between the first image layer and the second image layer mentioned above, i.e., the arrangement position between the first image layer and the second image layer in the plurality of layers, may be specifically as follows. For example, the first image layer is in front of the second image layer (e.g., the first image layer is located at the upper layer of the second image layer), or the first image layer is behind the second image layer (e.g., the first image layer is located at the lower layer of the second image layer). The relative position between the first image layer and the second image layer may be determined in the process of separating the target image in the operation S102. For example, in the distribution of the image layers as shown in FIG. 4, the image layer 01 and the image layer 02 are assumed as the first image layer and the second image layer respectively, and since the relative position between the image layer 01 and the image layer 02 is determined in the layer separating process, it may be directly determined that the relative position between the first image layer and the second image layer is that the first image layer is located at the upper layer of the second image layer.

After the relative relationship between the first image layer and the second image layer is determined, an image layer size parameter of at least one of the first image layer and the second image layer may be adjusted according to the relative position. The image layer size parameter is used for indicating a size of the image layer. In an example, the process of adjusting the image layer size parameter of at least one of the first image layer and the second image layer according to the relative position is as follows:

in a case where the first image layer is located between the second image layer and a user, increasing the image layer size parameter of the first image layer, and/or reducing the image layer size parameter of the second image layer; or, in a case where the second image layer is located between the first image layer and the user, increasing the image layer size parameter of the second image layer, and/or reducing the image layer size parameter of the first image layer.

It should be noted that, the process of adjusting the image layer size parameter of at least one of the first image layer and the second image layer is to appropriately enlarge the image layer relatively close to the user and appropriately reduce the image layer relatively far away from the user. For the first image layer and the second image layer, the image layer size parameter of the image layer at the front is increased, and the image layer size parameter of the image layer at the back is reduced, so that the size relationship between the layers may better conform to the perspective relationship, thereby improving the sense of reality of 3D display.

It should be noted that, the adjustment of the image layer size parameter of the image layer is not limited to adjustment of each image layer, one or two image layers may be selected from a plurality of image layers, and the image layer size parameters of the selected one or two image layers are adjusted according to the above method. In an example, in the distribution of the image layers shown in FIG. 4, the image layer 01 nearest to the user may be appropriately enlarged by adjusting the image layer size parameter, and the image layer 03 relatively far away from the user may be appropriately reduced by adjusting the image layer size parameter. The image layer 02 is located between the image layer 01 and the image layer 03, therefore, in the adjustment process of the image layer 01 and the image layer 03, the image layer 02 may be kept unchanged in size, and the image layer 04 as a background image layer may be kept unchanged in size.

It should be noted that, the relative distance between the first image layer and the second image layer, that is, the distance between the first image layer and the second image layer, is a distance defined by the terminal according to content in different layers. For example, in the distribution of the image layers as shown in FIG. 4, the image layer 02 indicates a girl, the image layer 03 indicates a house, and the image layer 04 indicates a background, therefore the terminal may determine an approximate distance between the image layer 02 and the image layer 03 according to a size ratio between the girl in the image layer 02 and the house in the image layer 03, and determine an approximate distance between the image layer 03 and the image layer 04 according to a size ratio of the house in the image layer 03 in the background of the image layer 04. The above-mentioned relative distance may be determined according to an empirically determined correspondence relationship, or may be determined by a pre-trained neural network model, and the specific manner for determining the relative distance is not limited in the embodiments of the present disclosure.

After the relative relationship between the first image layer and the second image layer is determined, an image layer shadow parameter may be generated according to the relative distance, and a shadow is generated for at least one of the first image layer and the second image layer according to the image layer shadow parameter, wherein the image layer shadow parameter is used for indicating the shadow generated for the image layer.

It should be noted that, in a 3D display process, a shadow may be added to an image layer so that a display effect of the image layer is more close to reality, thereby further improving a sense of reality of 3D display. The image layer shadow parameter is a corresponding parameter used for indicating to generate a shadow for the image layer.

The above-mentioned image layer shadow parameter may include a shadow size parameter and a shadow transparency parameter, and the process of generating the image layer shadow parameter according to the relative distance is embodied as generating the corresponding shadow size parameter and shadow transparency parameter according to the relative distance.

The above-mentioned shadow size parameter is used for indicating a size of the shadow, and the shadow size parameter is positively correlated with the relative distance, i.e., the longer the distance between the first image layer and the second image layer is, the larger the corresponding shadow required to formed is, that is, the larger the shadow size parameter is. Similarly, the shorter the distance between the first image layer and the second image layer is, the smaller the corresponding shadow required to be formed is, that is, the smaller the shadow size parameter is.

The above-mentioned shadow transparency parameter is used for indicating transparency of the shadow, and the shadow transparency parameter is negatively correlated with the relative distance, i.e., the longer the distance between the first image layer and the second image layer is, the lower the transparency of the corresponding shadow required to formed is, that is, the smaller the shadow transparency parameter is. Similarly, the shorter the distance between the first image layer and the second image layer is, the greater the transparency of the corresponding shadow required to be formed is, that is, the greater the shadow transparency parameter is. It should be noted that the above shadow transparency parameter may generally be represented by a percentage, for example, when the shadow transparency parameter is 100%, it represents that the shadow is not subjected to transparency processing, that is, the shadow is displayed at the highest density; when the shadow transparency parameter is 10%, it represents that the shadow has undergone a relatively high transparency processing, that is, the shadow is relatively transparent; and when the shadow transparency parameter is 0%, it represents that the shadow is invisible.

It should be noted that, when the relative distance between the first image layer and the second image layer is determined, the adjustment proportion of the image layer size parameter, the shadow size parameter and the shadow transparency parameter corresponding to the relative distance may be determined. The corresponding relationship between the relative distance and the image layer size parameter, the shadow size parameter and the shadow transparency parameter may be determined according to an empirical determined correspondence relationship, or may be determined through a pre-trained neural network model, which is not limited in the embodiment of the present disclosure.

Figure 7:
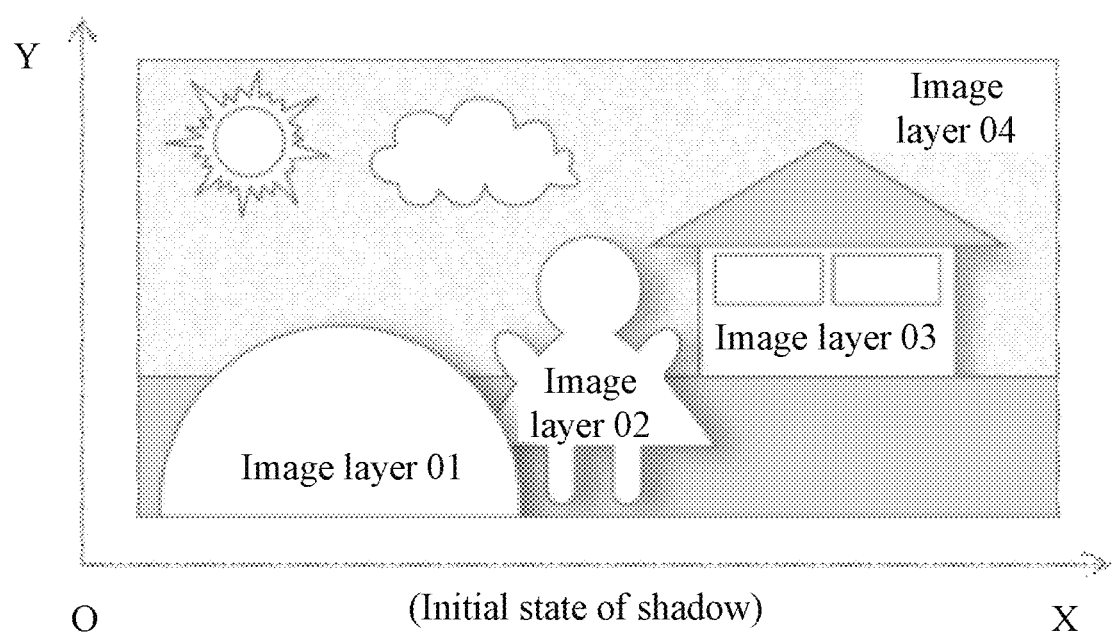
FIG. 7 is a schematic diagram (3) of separating a target image into image layers according to an embodiment of the present disclosure.

FIG. 7 is a schematic diagram (3) of separating a target image into image layers according to an embodiment of the present disclosure. The respective image layers obtained after adjusting, through the above operations, the image layer size parameter and the image layer shadow parameter for the image layer 01, the image layer 02, the image layer 03 and the image layer 04 in the distribution of the image layers shown in FIG. 4 are shown in FIG. 7.

On the one hand, in the embodiments of the present disclosure, since a flexible display unit which is bendable is used for the terminal, in the process of displaying the target image by the terminal, the flexible display unit for display may be subjected to a bending deformation according to an operation of the user. In this regard, in the embodiment of the present disclosure, for the case that the flexible display unit is deformed, on the basis that the above adjustment of the image layer parameter of at least one of the first image layer and the second image layer is performed, the image layer parameter of at least one of the first image layer and the second image layer may be further adjusted according to the direction in which the flexible display unit is deformed. The process will be described below by an exemplary embodiment.

The relative distance between the first image layer and the second image layer is adjusted according to the direction in which the flexible display unit is deformed.

The image layer parameter of at least one of the first image layer and the second image layer is adjusted according to the adjusted relative distance.

It should be noted that, the relative distance between the first image layer and the second image layer is adjusted according to the direction in which the flexible display unit is deformed. In an example, based on determining the relative distance between the first image layer and the second image layer, the relative distance may be further adjusted according to the direction in which the flexible display unit is deformed. For example, if the flexible display unit displays the target image in a non-deformed state at a certain moment, the relative distance between the first image layer and the second image layer may be directly determined; if the flexible display unit is deformed at a next moment, the relative distance may be further adjusted based on the relative distance. In another example, the relative distance may also be determined directly according to the direction in which the flexible display unit is deformed. For example, if the target image is displayed in the state that the flexible display unit is deformed, in the process of determining the relative distance between the first image layer and the second image layer, the final relative distance may be obtained directly according to the direction in which the flexible display unit is deformed.

The above-mentioned operation of adjusting the relative distance between the first image layer and the second image layer according to the direction in which the flexible display unit is deformed includes:

increasing the relative distance between the first image layer and the second image layer in a case where the flexible display unit is deformed in a direction towards a user; or, reducing the relative distance between the first image layer and the second image layer in a case where the flexible display unit is deformed in a direction away from the user.

Figure 8:
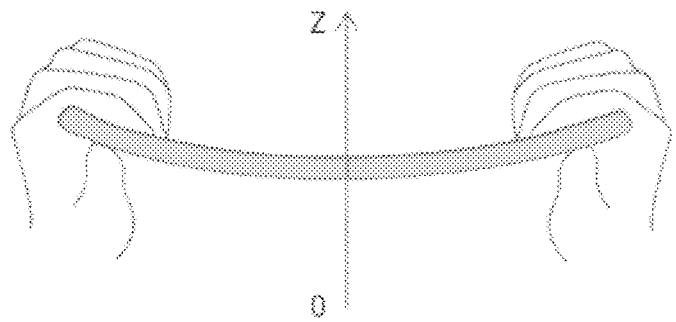
FIG. 8 is a schematic diagram (1) of deformation of a flexible display unit according to an embodiment of the present disclosure.
Figure 9:
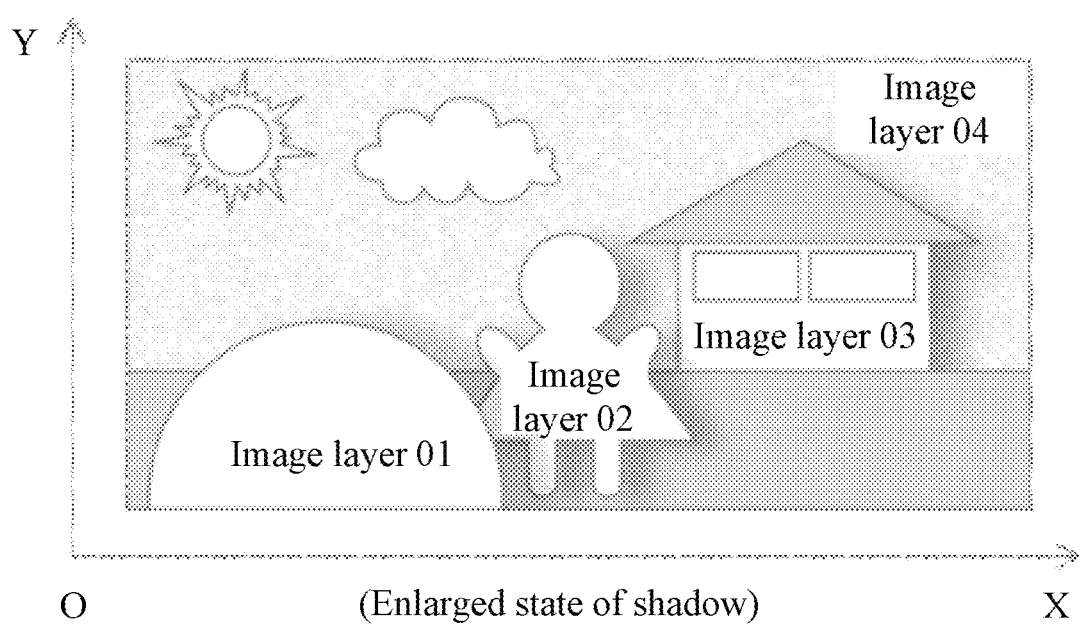
FIG. 9 is a schematic diagram (4) of separating a target image into image layers according to an embodiment of the present disclosure.

It should be noted that the direction in which the flexible display unit is deformed may be detected by a sensor. FIG. 8 is a schematic diagram (1) of deformation of a flexible display unit according to an embodiment of the present disclosure. As shown in FIG. 8, the flexible display unit is bent in a direction towards the user. In this case, the relative distance between the first image layer and the second image layer may be increased. Since the shadow size parameter of the image layer is positively correlated with the relative distance, and the shadow transparency parameter is negatively correlated with the relative distance, on the basis that the relative distance between the first image layer and the second image layer increases, the shadow size parameter needs to be correspondingly increased to enlarge the shadow, and at the same time, the shadow transparency parameter is reduced to make the shadow more transparent. FIG. 9 is a schematic diagram (4) of separating a target image into image layers according to an embodiment of the present disclosure, and respective image layers after adjustment is performed according to the foregoing manner are as shown in FIG. 9.

Figure 10:
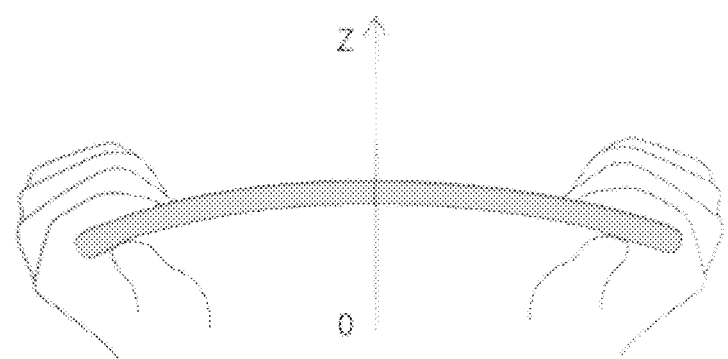
FIG. 10 is a schematic diagram (2) of deformation of a flexible display unit according to an embodiment of the present disclosure.
Figure 11:
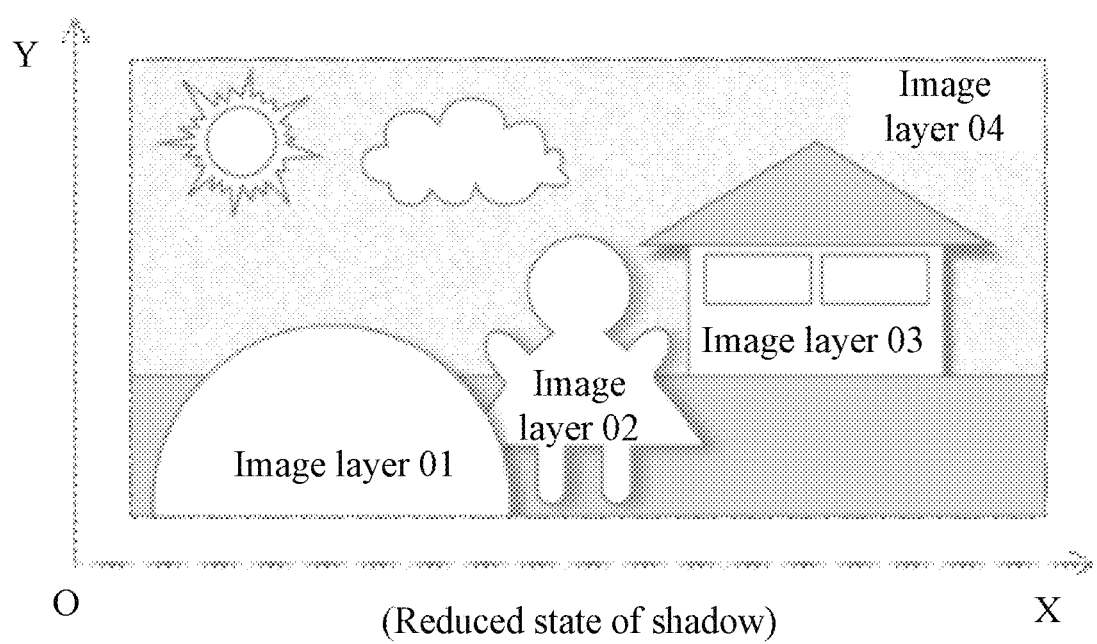
FIG. 11 is a schematic diagram (5) of separating a target image into image layers according to an embodiment of the present disclosure.

FIG. 10 is a schematic diagram (2) of deformation of a flexible display unit according to an embodiment of the present disclosure. As shown in FIG. 10, the flexible display unit is bent in a direction away from the user, and at this time, the relative distance between the first image layer and the second image layer may be reduced. Since the relative distance is positively correlated with the shadow size parameter of the image layer, and the relative distance is negatively correlated with the shadow transparency parameter, on the basis that the relative distance between the first image layer and the second image layer decreases, the shadow size parameter needs to be correspondingly reduced so as to reduce the shadow, and at the same time, the shadow transparency parameter is increased so as to make the shadow more dense. FIG. 11 is a schematic diagram (5) of separating a target image into image layers according to an embodiment of the present disclosure, and respective image layers after adjustment is performed according to the foregoing manner are as shown in FIG. 11.

In an exemplary embodiment, the operation of adjusting the image layer parameter of at least one of the first image layer and the second image layer according to the direction in which the flexible display unit is deformed may further include:

adjusting an image layer size parameter of at least one of the first image layer and the second image layer according to the direction in which the flexible display unit is deformed, wherein the image layer size parameter is used for indicating a size of the image layer.

In an exemplary embodiment, the operation of adjusting the image layer size parameter of at least one of the first image layer and the second image layer according to the direction in which the flexible display unit is deformed includes:

increasing the image layer size parameter of at least one of the first image layer and the second image layer in a case where the flexible display unit is deformed in a direction towards a user; or, reducing the image layer size parameter of at least one of the first image layer and the second image layer in a case where the flexible display unit is deformed in a direction away from the user.

It should be noted that, during the deformation of the flexible display unit, the image layer size may also be adjusted according to the direction in which the flexible display unit is deformed. Specifically, in a case where the flexible display unit is deformed in a direction towards the user, the image layer size parameter of at least one of the first image layer and the second image layer is increased, that is, at least one of the first image layer and the second image layer are enlarged, so as to further improve the sense of reality of the 3D display that the user may feel. Correspondingly, in a case where the flexible display unit is deformed in a direction away from the user, the image layer size parameter of at least one of the first image layer and the second image layer is reduced, so as to correspondingly weaken the 3D display effect when the user actively moves the flexible display unit away from the user, thereby preventing the user from dizziness and the like.

Figure 12:
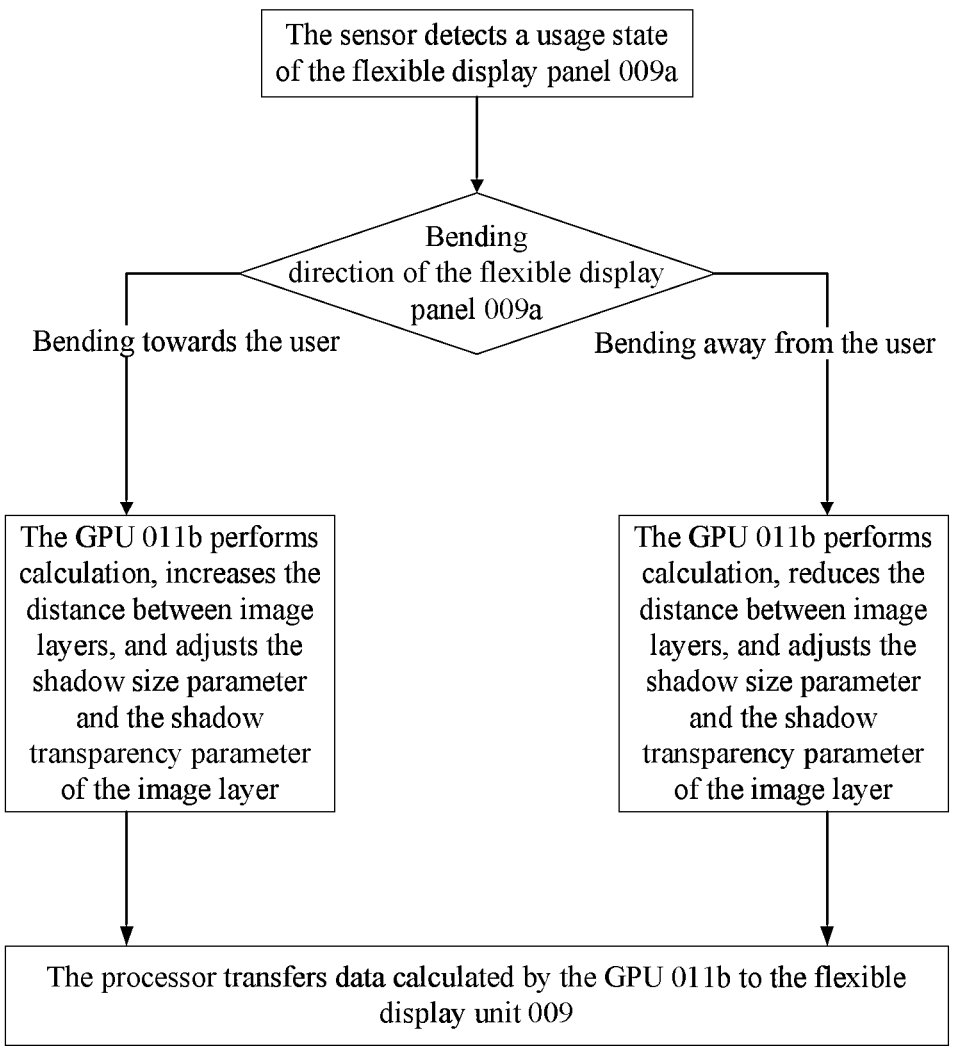
FIG. 12 is a flowchart (2) of an image display method according to an embodiment of the present disclosure.

FIG. 12 is a flowchart (2) of an image display method according to an embodiment of the present disclosure, and the process of adjusting the relative distance between the first image layer and the second image layer according to the deformation of the flexible display unit and further adjusting the parameter corresponding to the relative distance is shown in FIG. 12.

By means of the solution, in the process of using a terminal with a flexible screen, the distance of each image layer corresponding to a video or a picture may be adjusted in real time according to an operation of a user on the flexible display unit, such as bending, so that parameters, such as the image layer size, the image layer shadow size and the image layer shadow transparency, may be correspondingly changed with the bending manner of the flexible display unit. The method for adjusting the 3D display of the video or picture on the terminal with the flexible screen may not only improve the 3D display effect, but also realize interaction between 3D display and user operation, so that the user experience may also be improved.

On the other hand, during the use of the terminal, the relative position between the user and the terminal may change at any time, for example, the user may move left or right with respect to the terminal. In this regard, the embodiment of the present disclosure provides a solution for the described case where the user generates an offset relative to the terminal. On the basis of the described adjustment of the image layer parameter of at least one of the first image layer and the second image layer, the image layer parameter of at least one of the first image layer and the second image layer may be further adjusted according to an offset state of the user relative to the terminal. The process is described below by means of an exemplary embodiment.

After adjusting the image layer parameter of at least one of the first image layer and the second image layer according to the relative relationship between the first image layer and the second image layer, the method may further include:

detecting offset information between a user and the terminal, and adjusting the image layer parameter of at least one of the first image layer and the second image layer according to the offset information, wherein the offset information is used for indicating an offset state of the user relative to the terminal.

It should be noted that the offset information is used for indicating an offset state of the user relative to the terminal, and the offset state may include an offset direction and an offset distance, wherein the offset direction is used for indicating a direction that the user is offset relative to the terminal, for example, the user is offset to the left or to the right relative to the terminal; and the offset distance is used for indicating a distance that the user is offset relative to the terminal, for example, the user is offset by 10 cm relative to the terminal. In an exemplary embodiment, the offset information may include offset direction information indicating the offset direction and offset distance information indicating the offset distance.

It should be noted that the foregoing offset information may be detected by using a camera or a sensor in the terminal. For example, an image is taken by a front camera of the terminal, so as to determine a possible offset state of the user relative to the terminal. Alternatively, an optical structure sensor or the like for face recognition may be used to detect the face data of the user, so as to determine the possible offset state of the user relative to the terminal. The embodiment of the present disclosure does not limit the specific means for detection of the offset information.

In the above process of adjusting the image layer parameter of at least one of the first image layer and the second image layer according to the offset information, an image layer shadow parameter of at least one of the first image layer and the second image layer may be adjusted according to the offset information. Here, the image layer shadow parameter is the image layer shadow parameter described in the above embodiments, which will not be repeated herein. The process of adjusting the image layer shadow parameter of at least one of the first image layer and the second image layer is described below through an exemplary embodiment.

In an exemplary embodiment, the image layer shadow parameter includes a shadow length parameter, wherein the shadow length parameter is used for indicating a length of the shadow in a preset direction.

The process of adjusting the image layer shadow parameter of at least one of the first image layer and the second image layer according to the offset information includes the following operations.

An adjustment direction of the shadow length parameter is determined according to the offset direction information.

The shadow length parameter of at least one of the first image layer and the second image layer is adjusted in the adjustment direction according to the offset distance information.

It should be noted that, the shadow size parameter in the image layer shadow parameter is used for indicating an overall size of the shadow. A plane coordinate formed by an X axis and a Y axis is established based on a center of the shadow, that is, in the process of adjusting the shadow size parameter, the shadow is synchronously enlarged or reduced on the X axis and the Y axis. The shadow length parameter in the image layer shadow parameter is used for indicating a length of the shadow in a preset direction, for example, the length of the shadow in the X axis direction or the length of the shadow in the Y axis direction, that is, in the process of adjusting the shadow length parameter, the shadow is enlarged or reduced on the X axis or the Y axis. Thus, the direction that the user is offset relative to the terminal may be determined according to the offset direction information in the offset information, and the shadow may be stretched in the opposite direction of the offset direction, wherein the stretch distance is positively correlated with the offset distance indicated by the offset distance information in the offset information, i.e., the larger the offset of the user relative to the terminal is, the greater the stretch distance of the shadow length is.

Figure 13:
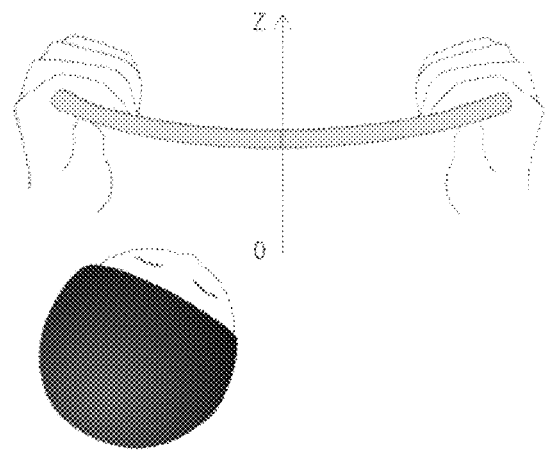
FIG. 13 is a schematic diagram (1) illustrating an offset state of a user according to an embodiment of the present disclosure.
Figure 14:
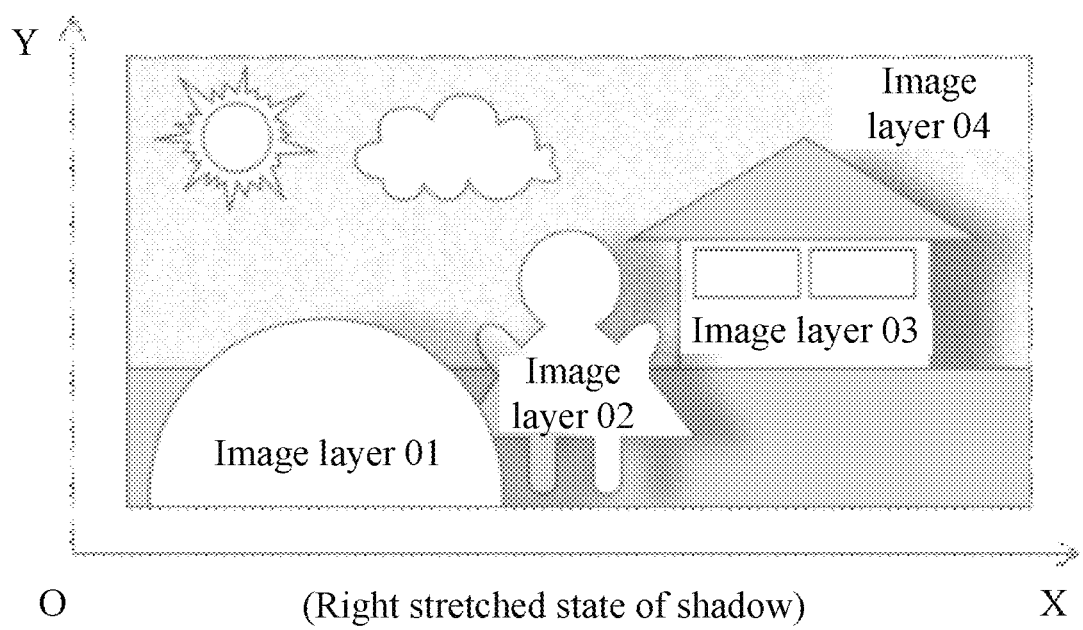
FIG. 14 is a schematic diagram (6) of separating a target image into image layers according to an embodiment of the present disclosure.

In an example, FIG. 13 is a schematic diagram (1) illustrating an offset state of a user according to an embodiment of the present disclosure. As shown in FIG. 13, the user is offset to the left relative to the terminal, and the terminal detects the offset information by using a camera, and stretches the length of the shadow of at least one of the first image layer and the second image layer to the right, where the stretched length is positively correlated with the offset distance of the user. FIG. 14 is a schematic diagram (6) of separating a target image into image layers according to an embodiment of the present disclosure, and the adjusted shadow of the image layer is as shown in FIG. 14.

Figure 15:
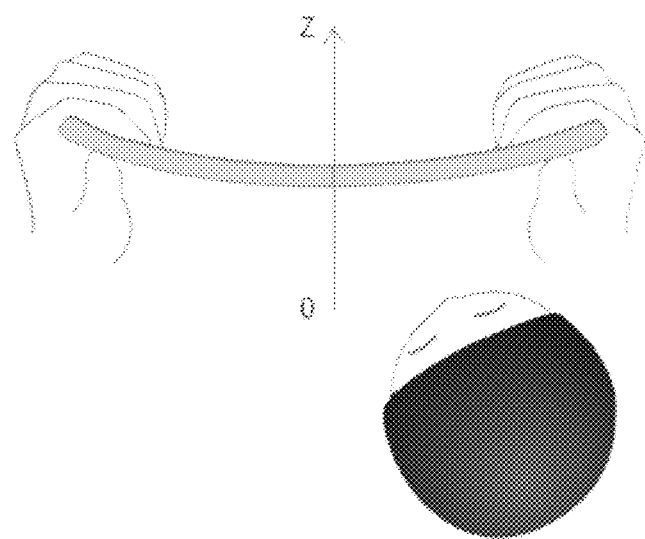
FIG. 15 is a schematic diagram (2) illustrating an offset state of a user according to an embodiment of the present disclosure.
Figure 16:
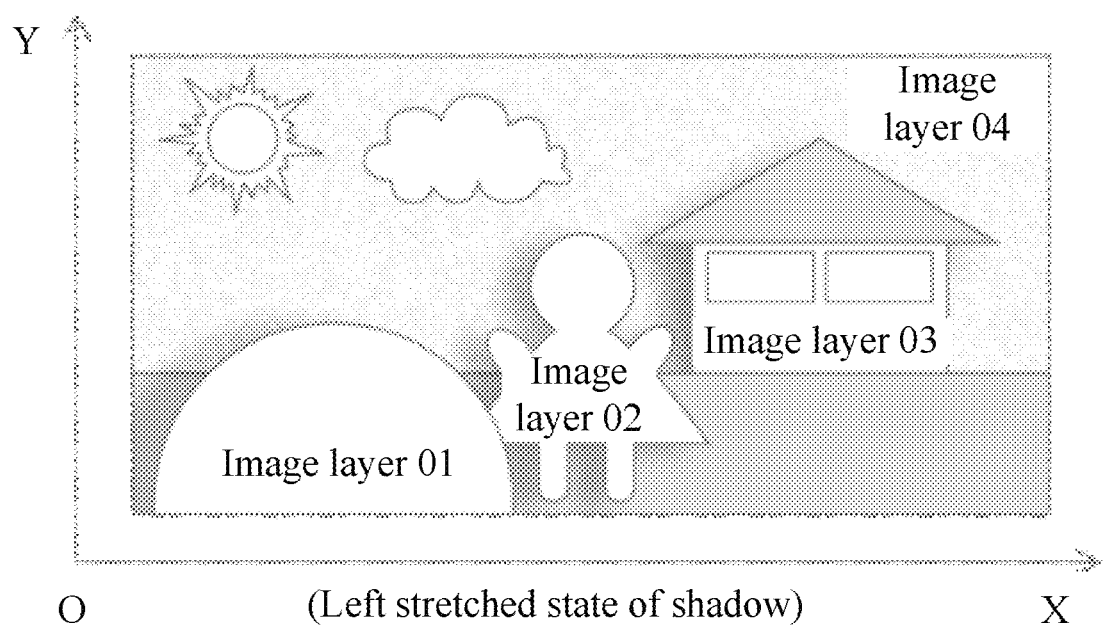
FIG. 16 is a schematic diagram (7) of separating a target image into image layers according to an embodiment of the present disclosure.

In another example, FIG. 15 is a schematic diagram (2) illustrating an offset state of a user according to an embodiment of the present disclosure. As shown in FIG. 15, the user is offset to the right relative to the terminal, and the terminal detects the offset information by using a camera, and stretches the length of the shadow of at least one of the first image layer and the second image layer to the left, where the stretched length is positively correlated with the offset distance of the user. FIG. 16 is a schematic diagram (7) of separating a target image into image layers according to an embodiment of the present disclosure, and the adjusted shadow of the image layer is as shown in FIG. 16.

Figure 17:
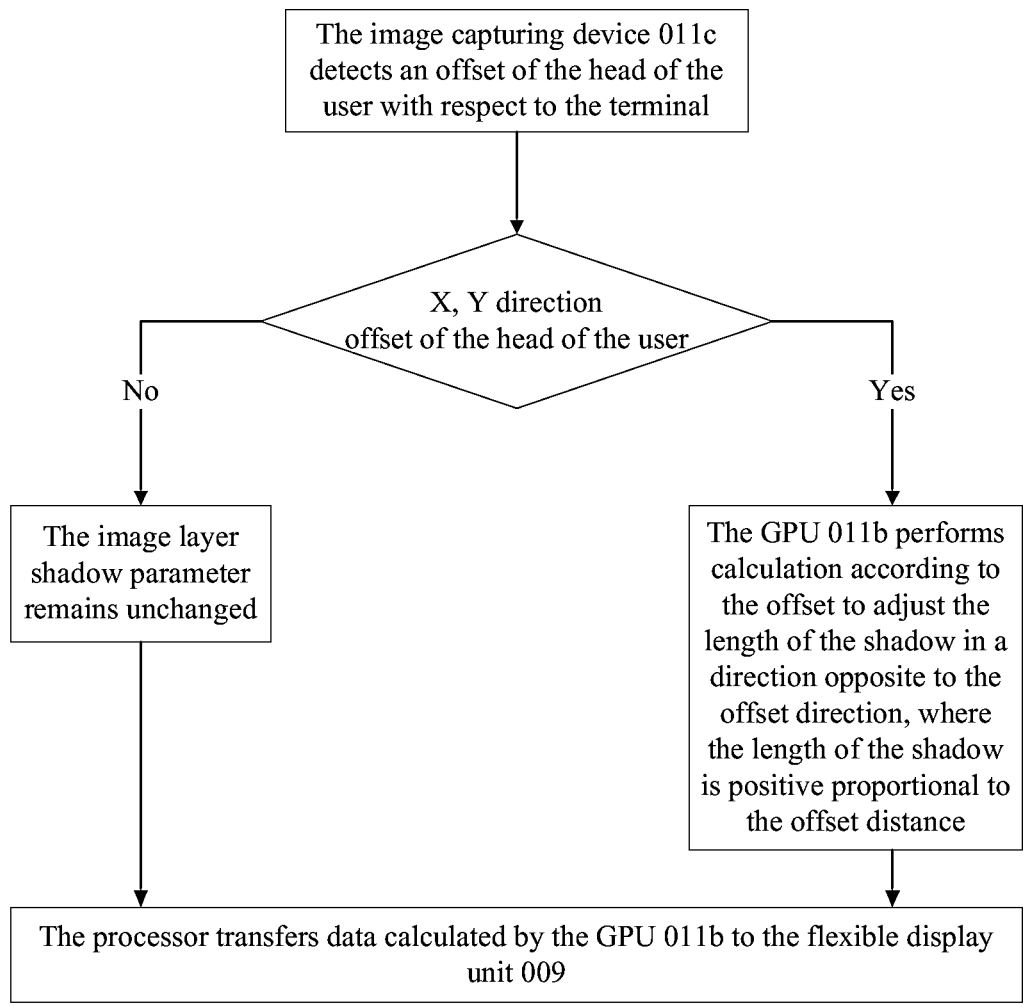
FIG. 17 is a flowchart (3) of an image display method according to an embodiment of the present disclosure.

FIG. 17 is a flowchart (3) of an image display method according to an embodiment of the present disclosure, and the process of adjusting the shadow length parameter of at least one of the first image layer and the second image layer according to the offset state of the user relative to the terminal is as shown in FIG. 17.

It should be noted that, the process of adjusting the shadow length parameter of the image layer according to the offset state of the user relative to the terminal in the above exemplary embodiment may be used in conjunction with the process of adjusting the relative distance between the image layers according to the deformation of the flexible display unit in the described embodiment, or may be used independently, which is not limited in the embodiment of the present disclosure.

By means of the solution, during the use of the terminal, the changes of the lengths of the shadow in the image layer in different directions may be adjusted in real time according to the usage state (such as an offset) of the user relative to the terminal, thereby simulating the change of the angle of the shadow in reality. The foregoing adjustment manner for 3D display of a video or picture in the terminal may further improve the 3D display effect and user experience.

At S106, the target image is displayed according to at least one of the first image layer and the second image layer of which the image layer parameter is adjusted.

It should be noted that, at least one of the first image layer and the second image layer of which the image layer parameter is adjusted refers to image layer of which the image layer parameter is adjusted for one or multiple times. For example, in the case where the user bends the terminal with the flexible screen, at least one of the first image layer and the second image layer of which the image layer parameter is adjusted in the described operation S106 is at least one of the first image layer and the second image layer after the relative distance between the first image layer and the second image layer is adjusted so that the image layer size parameter or the image layer shadow parameter is adjusted accordingly according to the described exemplary embodiment. For another example, in a case where an offset of the user relative to the terminal is detected, at least one of the first image layer and the second image layer of which the image layer parameter is adjusted in the above operation S106 is at least one of the first image layer and the second image layer after the shadow length parameter of at least one of the first image layer and the second image layer is adjusted according to the above exemplary embodiment.

It should be noted that, when the target image is a video, the processing object in the foregoing operation S102 and operation S104 is a certain video frame in the video, and in operation S106, the displayed target image is a video obtained after processing is performed on each video frame in the video according to the processing manners of the video frames in the operation S102 and operation S104.

By means of the embodiments of the present disclosure, in a process of displaying a target image, a terminal may separate the target image into image layers at least including a first image layer and a second image layer, so as to adjust the image layer parameter of at least one of the first image layer and the second image layer according to a relative relationship between the first image layer and the second image layer, and then display the target image according to at least one of the first image layer and the second image layer of which the image layer parameter is adjusted. According to the image display method in the embodiments of the present disclosure, a 3D display effect of an image may be adjusted on the terminal according to actual content of the image, so that the reality of the 3D display of the image on the terminal may be effectively improved. On this basis, the embodiments of the present disclosure may also adjust the 3D display effect in real time according to the deformation of the terminal with the flexible screen, the offset between the user and the terminal or the like, so that the 3D display effect may be further improved, and the 3D display of the image may be presented accordingly based on various operations or behaviors of the user, thereby improving the user experience. Therefore, the embodiments of the present disclosure may solve the problem in the related art that a 3D display effect cannot be effectively achieved on a flexible screen, so as to achieve the effect of significantly improving the 3D display effect.

Through the description of the foregoing embodiments, a person having ordinary skill in the art may clearly understand that the method according to the foregoing embodiments may be implemented by software in addition to a necessary universal hardware platform, and definitely may also be implemented by hardware. However, in many cases, the former is a exemplary implementation. Based on such understanding, the essence of technical solution of the embodiments of the present disclosure or the part contributing to the related art may be embodied in the form of a software product. The computer software product is stored in a storage medium (such as a ROM/RAM, a magnetic disk, or an optical disk), and includes several instructions for instructing a terminal device (which may be a mobile phone, a computer, a server, or a network device) to execute the method described in the embodiments of the present disclosure.

The embodiments of the present disclosure further provide an image display apparatus, which is arranged in a terminal and is used for implementing the described embodiments and exemplary implementations, and what has been described will not be elaborated. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

Figure 18:
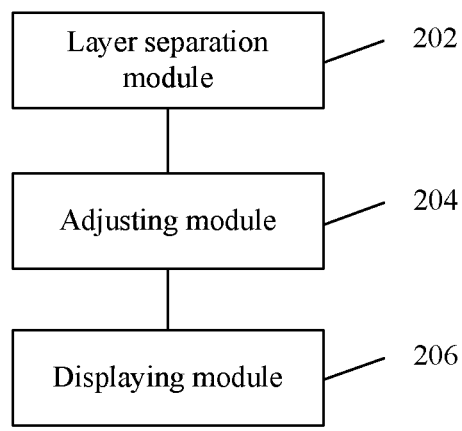
FIG. 18 is a structural block diagram of an image display apparatus according to an embodiment of the present disclosure.

FIG. 18 is a structural block diagram of an image display apparatus according to an embodiment of the present disclosure. As shown in FIG. 18, the image display apparatus in the embodiment of the present disclosure includes a layer separation module 202, an adjustment module 204, and a display module 206.

The layer separation module 202 is configured to separate a target image into a plurality of image layers, wherein the plurality of image layers at least includes a first image layer and a second image layer.

The adjusting module 204 is configured to adjust an image layer parameter of at least one of the first image layer and the second image layer according to a relative relationship between the first image layer and the second image layer.

The displaying module 206 is configured to display the target image according to at least one of the first image layer and the second image layer of which the image layer parameter is adjusted.

It should be noted that, other exemplary embodiments and technical effects of the image display apparatus in the embodiments of the present disclosure correspond to the foregoing image display method, and are not described herein again.

In an exemplary embodiment, the above layer separation module 202 may further be configured to determine the relative relationship between the first image layer and the second image layer after separating the target image into the plurality of image layers.

The relative relationship between the first image layer and the second image layer includes: a relative position between the first image layer and the second image layer, and a relative distance between the first image layer and the second image layer; the relative position is used for indicating an arrangement position between the first image layer and the second image layer in the plurality of image layers, and the relative distance is used for indicating a distance between the first image layer and the second image layer.

In an exemplary embodiment, the adjusting module 204 may be configured to adjust the image layer parameter of at least one of the first image layer and the second image layer according to the relative relationship between the first image layer and the second image layer in a following manner:

adjusting an image layer size parameter of at least one of the first image layer and the second image layer according to the relative position, wherein the image layer size parameter is used for indicating a size of the image layer.

In an exemplary embodiment, the adjusting module 204 may be configured to adjust the image layer size parameter of at least one of the first image layer and the second image layer according to the relative position in a following manner:

in a case where the first image layer is located between the second image layer and a user, increasing the image layer size parameter of the first image layer, and/or reducing the image layer size parameter of the second image layer; or, in a case where the second image layer is located between the first image layer and the user, increasing the image layer size parameter of the second image layer, and/or reducing the image layer size parameter of the first image layer.

In an exemplary embodiment, the adjusting module 204 may be configured to adjust the image layer parameter of at least one of the first image layer and the second image layer according to the relative relationship between the first image layer and the second image layer in a following manner:

generating an image layer shadow parameter according to the relative distance, and generating a shadow for at least one of the first image layer and the second image layer according to the image layer shadow parameter, wherein the image layer shadow parameter is used for indicating the shadow generated for the image layer.

In an exemplary embodiment, the image layer shadow parameter includes a shadow size parameter and a shadow transparency parameter, wherein the shadow size parameter is used for indicating a size of the shadow, and the shadow size parameter is positively correlated with the relative distance; the shadow transparency parameter is used for indicating transparency of the shadow, and the shadow transparency parameter is negatively correlated with the relative distance.

In an exemplary embodiment, the terminal includes a flexible display unit, the flexible display unit being deformable; the adjusting module 204 may be configured to perform the following operation after adjusting the image layer parameter of at least one of the first image layer and the second image layer according to the relative relationship between the first image layer and the second image layer:

adjusting the image layer parameter of at least one of the first image layer and the second image layer according to a direction in which the flexible display unit is deformed.

In an exemplary embodiment, the adjusting module 204 may be configured to adjust the image layer parameter of at least one of the first image layer and the second image layer according to the direction in which the flexible display unit is deformed in a following manner:

adjusting the relative distance between the first image layer and the second image layer according to the direction in which the flexible display unit is deformed; and adjusting the image layer parameter of at least one of the first image layer and the second image layer according to the adjusted relative distance.

In an exemplary embodiment, the adjusting module 204 is configured to adjust the relative distance between the first image layer and the second image layer according to the direction in which the flexible display unit is deformed in a following manner:

increasing the relative distance between the first image layer and the second image layer in a case where the flexible display unit is deformed in a direction towards a user; or, reducing the relative distance between the first image layer and the second image layer in a case where the flexible display unit is deformed in a direction away from the user.

In an exemplary embodiment, the adjusting module 204 may be further configured to perform the following operation when adjusting the image layer parameter of at least one of the first image layer and the second image layer according to the direction in which the flexible display unit is deformed:

adjusting an image layer size parameter of at least one of the first image layer and the second image layer according to the direction in which the flexible display unit is deformed, wherein the image layer size parameter is used for indicating a size of the image layer.

In an exemplary embodiment, the adjusting module 204 may be configured to adjust the image layer size parameter of at least one of the first image layer and the second image layer according to the direction in which the flexible display unit is deformed in a following manner:

increasing the image layer size parameter of at least one of the first image layer and the second image layer in a case where the flexible display unit is deformed in a direction towards a user; or, reducing the image layer size parameter of at least one of the first image layer and the second image layer in a case where the flexible display unit is deformed in a direction away from the user.

In an exemplary embodiment, the adjusting module 204 may be further configured to perform the following operation after adjusting the image layer parameter of at least one of the first image layer and the second image layer according to the relative relationship between the first image layer and the second image layer:

detecting offset information between a user and the terminal, and adjusting the image layer parameter of at least one of the first image layer and the second image layer according to the offset information, wherein the offset information is used for indicating an offset state of the user relative to the terminal.

In an exemplary embodiment, the adjusting module 204 may be configured to adjust the image layer parameter of at least one of the first image layer and the second image layer according to the offset information in a following manner:

adjusting an image layer shadow parameter of at least one of the first image layer and the second image layer according to the offset information, wherein the image layer shadow parameter is used for indicating the shadow generated for the image layer.

In an exemplary embodiment, the offset information includes offset direction information and offset distance information, wherein the offset direction information is used for indicating a direction that the user is offset relative to the terminal, and the offset distance information is used for indicating a distance that the user is offset relative to the terminal; the image layer shadow parameter includes a shadow length parameter, wherein the shadow length parameter is used for indicating a length of the shadow in a preset direction.

The adjusting module 204 is configured to adjust the image layer shadow parameter of at least one of the first image layer and the second image layer according to the offset information in a following manner:

determining an adjustment direction of the shadow length parameter according to the offset direction information; and adjusting the shadow length parameter of at least one of the first image layer and the second image layer in the adjustment direction according to the offset distance information.

It should be noted that each module may be implemented by software or hardware. The latter may be implemented in the following manner, but is not limited thereto. All the modules are located in a same processor; alternatively, the modules are located in different processors in an arbitrary combination.

Embodiments of the present disclosure provide a computer readable storage medium. The computer readable storage medium stores a computer program, wherein the computer program is configured to execute the operations in any one of the method embodiments at runtime.

In an exemplary embodiment, the computer readable storage medium may include, but is not limited to, any medium that may store a computer program, such as a USB flash drive, a Read-Only Memory (ROM), a Random Access Memory (RAM), a removable hard disk, a magnetic disk, or an optical disc.

Embodiments of the present disclosure provide an electronic apparatus, including a memory and a processor, wherein the memory stores a computer program, and the processor is configured to run the computer program so as to execute operations in any one of the method embodiments.

In an exemplary embodiment, the electronic apparatus may further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those having ordinary skill in the art should understand that each module or each operation of the embodiments of the present disclosure may be implemented by a universal computing device, and the modules or operations may be concentrated on a single computing device or distributed on a network formed by a plurality of computing devices, and may be implemented by program codes executable for the computing devices, so that the modules or operations may be stored in a storage device and executed by a computing device. The shown or described operations may be executed in sequences different from those described here in some cases, or may form each integrated circuit module respectively, or multiple modules or operations therein may form a single integrated circuit module for implementation. Thus, the present disclosure is not limited to any particular combination of hardware and software.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection defined by the appended set of claims of the present disclosure.

What is claimed is:

1. An image display method applied to a terminal, wherein the method comprises:
    separating a target image into a plurality of image layers, wherein the plurality of image layers at least comprises a first image layer and a second image layer;
    adjusting an image layer parameter of at least one of the first image layer and the second image layer according to a relative relationship between the first image layer and the second image layer; and
    displaying the target image according to at least one of the first image layer and the second image layer of which the image layer parameter is adjusted;

wherein the terminal comprises a flexible display unit, the flexible display unit being deformable; and after adjusting the image layer parameter of at least one of the first image layer and the second image layer according to the relative relationship between the first image layer and the second image layer, the method further comprises:

adjusting the image layer parameter of at least one of the first image layer and the second image layer according to a direction in which the flexible display unit is deformed.

2. The method according to claim 1, wherein after separating the target image into the plurality of image layers, the method may further comprise: determining the relative relationship between the first image layer and the second image layer;

the relative relationship between the first image layer and the second image layer comprises: a relative position between the first image layer and the second image layer, and a relative distance between the first image layer and the second image layer; wherein the relative position is used for indicating an arrangement position between the first image layer and the second image layer in the plurality of image layers, and the relative distance is used for indicating a distance between the first image layer and the second image layer.

3. The method according to claim 2, wherein adjusting the image layer parameter of at least one of the first image layer and the second image layer according to the relative relationship between the first image layer and the second image layer comprises:

adjusting an image layer size parameter of at least one of the first image layer and the second image layer according to the relative position, wherein the image layer size parameter is used for indicating a size of at least one of the first image layer and the second image layer.

4. The method according to claim 3, wherein adjusting the image layer size parameter of at least one of the first image layer and the second image layer according to the relative position comprises:

in a case where the first image layer is located between the second image layer and a user, increasing the image layer size parameter of the first image layer; or, in a case where the first image layer is located between the second image layer and the user, reducing the image layer size parameter of the second image layer; or, in a case where the first image layer is located between the second image layer and the user, increasing the image layer size parameter of the first image layer, and reducing the image layer size parameter of the second image layer; or, in a case where the second image layer is located between the first image layer and the user, increasing the image layer size parameter of the second image layer; or, in a case where the second image layer is located between the first image layer and the user, reducing the image layer size parameter of the first image layer; or, in a case where the second image layer is located between the first image layer and the user, increasing the image layer size parameter of the second image layer, and reducing the image layer size parameter of the first image layer.

5. The method according to claim 3, wherein adjusting the image layer size parameter of at least one of the first image layer and the second image layer according to the relative position comprises:

determining an adjustment proportion of the image layer size parameter corresponding to the relative distance, wherein a corresponding relationship between the relative distance and the image layer size parameter is determined according to an empirical determined correspondence relationship, or is determined through a pre-trained neural network model.

6. The method according to claim 2, wherein adjusting the image layer parameter of at least one of the first image layer and the second image layer according to the relative relationship between the first image layer and the second image layer further comprises:

generating an image layer shadow parameter according to the relative distance, and generating a shadow for at least one of the first image layer and the second image layer according to the image layer shadow parameter, wherein the image layer shadow parameter is used for indicating the shadow generated for at least one of the first image layer and the second image layer.

7. The method according to claim 6, wherein the image layer shadow parameter comprises a shadow size parameter and a shadow transparency parameter, wherein the shadow size parameter is used for indicating a size of the shadow, and the shadow size parameter is positively correlated with the relative distance; the shadow transparency parameter is used for indicating transparency of the shadow, and the shadow transparency parameter is negatively correlated with the relative distance.

8. The method according to claim 7, wherein
a corresponding relationship between the relative distance and the shadow size parameter is determined according to an empirical determined correspondence relationship, or is determined through a pre-trained neural network model.

9. The method according to claim 7, wherein
a corresponding relationship between the relative distance and the shadow transparency parameter is determined according to an empirical determined correspondence relationship, or is determined through a pre-trained neural network model.

10. The method according to claim 2, wherein adjusting the image layer parameter of at least one of the first image layer and the second image layer according to the direction in which the flexible display unit is deformed comprises:

adjusting the relative distance between the first image layer and the second image layer according to the direction in which the flexible display unit is deformed; and adjusting the image layer parameter of at least one of the first image layer and the second image layer according to the adjusted relative distance.

11. The method according to claim 10, wherein adjusting the relative distance between the first image layer and the second image layer according to the direction in which the flexible display unit is deformed comprises:

increasing the relative distance between the first image layer and the second image layer in a case where the flexible display unit is deformed in a direction towards a user; or, reducing the relative distance between the first image layer and the second image layer in a case where the flexible display unit is deformed in a direction away from the user.

12. The method according to claim 1, wherein adjusting the image layer parameter of at least one of the first image layer and the second image layer according to the direction in which the flexible display unit is deformed further comprises:

adjusting an image layer size parameter of at least one of the first image layer and the second image layer according to the direction in which the flexible display unit is deformed, wherein the image layer size parameter is used for indicating a size of at least one of the first image layer and the second image layer.

13. The method according to claim 12, wherein adjusting the image layer size parameter of at least one of the first image layer and the second image layer according to the direction in which the flexible display unit is deformed comprises:

increasing the image layer size parameter of at least one of the first image layer and the second image layer in a case where the flexible display unit is deformed in a direction towards a user; or, reducing the image layer size parameter of at least one of the first image layer and the second image layer in a case where the flexible display unit is deformed in a direction away from the user.

14. The method according to claim 2, wherein after adjusting the image layer parameter of at least one of the first image layer and the second image layer according to the relative relationship between the first image layer and the second image layer, the method further comprises:

detecting offset information between a user and the terminal, and adjusting the image layer parameter of at least one of the first image layer and the second image layer according to the offset information, wherein the offset information is used for indicating an offset state of the user relative to the terminal.

15. The method according to claim 14, wherein adjusting the image layer parameter of at least one of the first image layer and the second image layer according to the offset information comprises:

adjusting an image layer shadow parameter of at least one of the first image layer and the second image layer according to the offset information, wherein the image layer shadow parameter is used for indicating a shadow generated for at least one of the first image layer and the second image layer.

16. The method according to claim 15, wherein the offset information comprises offset direction information and offset distance information, wherein the offset direction information is used for indicating a direction that the user is offset relative to the terminal, and the offset distance information is used for indicating a distance that the user is offset relative to the terminal; the image layer shadow parameter comprises a shadow length parameter, wherein the shadow length parameter is used for indicating a length of the shadow in a preset direction; and adjusting the image layer shadow parameter of at least one of the first image layer and the second image layer according to the offset information comprises:

determining an adjustment direction of the shadow length parameter according to the offset direction information; and adjusting the shadow length parameter of at least one of the first image layer and the second image layer in the adjustment direction according to the offset distance information.

17. An electronic apparatus, comprising a memory and a processor, wherein the memory stores a computer program, and the processor is configured to run the computer program so as to execute the method according to claim 1.

18. An image display apparatus disposed on a terminal, the apparatus comprising a memory storing instructions and a processor in communication with the memory, wherein the processor is configured to execute the instructions to:

separate a target image into a plurality of image layers, wherein the plurality of image layers at least comprises a first image layer and a second image layer;

adjust an image layer parameter of at least one of the first image layer and the second image layer according to a relative relationship between the first image layer and the second image layer; and display the target image according to at least one of the first image layer and the second image layer of which the image layer parameter is adjusted;

wherein the terminal comprises a flexible display unit, the flexible display unit being deformable; and the processor is further configured to execute the instructions to:

after adjusting the image layer parameter of at least one of the first image layer and the second image layer according to the relative relationship between the first image layer and the second image layer, adjust the image layer parameter of at least one of the first image layer and the second image layer according to a direction in which the flexible display unit is deformed.

19. A non-transitory computer readable storage medium, wherein the non-transitory computer readable storage medium stores a computer program, wherein the computer program is configured to:

separate a target image into a plurality of image layers, wherein the plurality of image layers at least comprises a first image layer and a second image layer;

adjust an image layer parameter of at least one of the first image layer and the second image layer according to a relative relationship between the first image layer and the second image layer; and display the target image according to at least one of the first image layer and the second image layer of which the image layer parameter is adjusted;

wherein the computer program is further configured to, after adjusting the image layer parameter of at least one of the first image layer and the second image layer according to the relative relationship between the first image layer and the second image layer, adjust the image layer parameter of at least one of the first image layer and the second image layer according to a direction in which a flexible display unit is deformed, the flexible display unit being in a terminal, and the flexible display unit being deformable.

* * * * *